United States Patent
Zhu

(10) Patent No.: US 8,667,541 B1
(45) Date of Patent: Mar. 4, 2014

(54) INTELLIGENT HANDSET REMOTE CONTROL

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 835 days.

(21) Appl. No.: 12/606,239

(22) Filed: Oct. 27, 2009

(51) Int. Cl.
*G06F 3/00* (2006.01)
*G06F 13/00* (2006.01)
*H04N 5/445* (2011.01)
*H04N 7/16* (2011.01)
*H04N 7/173* (2011.01)

(52) U.S. Cl.
USPC .............. 725/59; 725/39; 725/48; 725/49; 725/54; 725/62; 725/114; 725/131; 725/139; 725/151; 701/516; 455/456.2

(58) Field of Classification Search
USPC .............. 725/38, 39, 48–50, 54, 59, 62, 114, 725/118, 131, 138, 139, 151; 455/456.1, 455/456.2; 701/516
See application file for complete search history.

(56) References Cited

U.S. PATENT DOCUMENTS

| | | | |
|---|---|---|---|
| 8,499,316 B2* | 7/2013 | Lincoln | 725/19 |
| 8,528,020 B2* | 9/2013 | DeLaCruz et al. | 725/49 |
| 2002/0144289 A1* | 10/2002 | Taguchi et al. | 725/112 |
| 2005/0213938 A1* | 9/2005 | Ozawa et al. | 386/83 |
| 2006/0095471 A1* | 5/2006 | Krikorian et al. | 707/104.1 |
| 2009/0010612 A1* | 1/2009 | Allen et al. | 386/83 |
| 2009/0083801 A1* | 3/2009 | Hardacker et al. | 725/56 |
| 2009/0097530 A1* | 4/2009 | Dhodapkar et al. | 375/131 |
| 2009/0133073 A1* | 5/2009 | DaLaCruz et al. | 725/49 |
| 2009/0235309 A1* | 9/2009 | Roe | 725/39 |
| 2010/0138856 A1* | 6/2010 | Anglin, Jr. | 725/30 |
| 2010/0191466 A1* | 7/2010 | DeLuca et al. | 701/213 |
| 2010/0211978 A1* | 8/2010 | Hsiao | 725/56 |
| 2011/0055874 A1* | 3/2011 | Libin et al. | 725/62 |
| 2011/0171941 A1* | 7/2011 | Cusick et al. | 455/414.1 |
| 2011/0271301 A1* | 11/2011 | Kennedy | 725/38 |
| 2012/0110622 A1* | 5/2012 | Vermola | 725/50 |
| 2012/0294297 A1* | 11/2012 | Chen et al. | 370/338 |

* cited by examiner

*Primary Examiner* — Pinkal R Chokshi

(57) ABSTRACT

A system is provided for intelligent handset remote control. The system includes a processor on a handset and a remote control component. When executed by the processor, the remote control component stores a list of media network providers, determines a location associated with the handset, retrieves an index associated with a media presentation device based on the location, and maps each of the media network providers in the list with at most one entry in the index. The remote control component also presents the list of media network providers to a user interface for the handset as a list of selectable inputs, receives a selection of one of the list of selectable inputs via the user interface, and transmits a command to the media presentation device to present media based on an entry in the index that corresponds to the selection.

16 Claims, 5 Drawing Sheets

Fig. 4
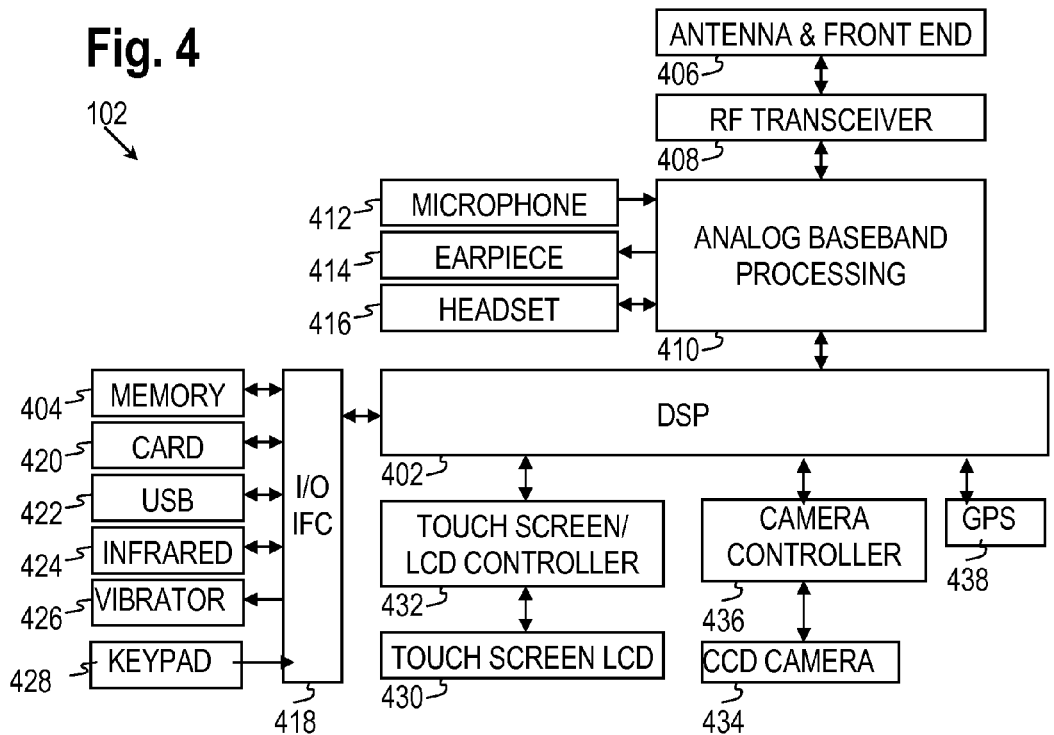
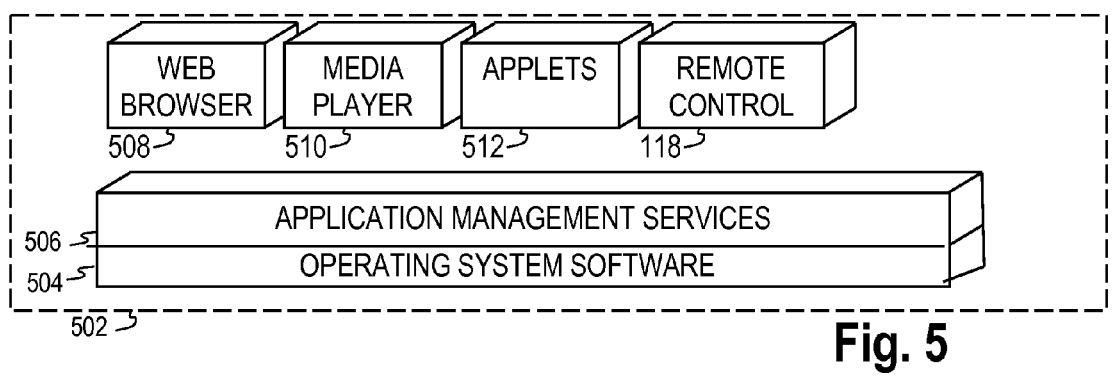
Fig. 5

INTELLIGENT HANDSET REMOTE CONTROL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A traveler may experience frustration when attempting to watch their favorite national television network provider on the television in their hotel room because their hotel may use a different numbering system for television channels than the traveler is accustomed to using at home. Even if the traveler temporarily changes the television channel to their favorite network provider, if the favorite network provider is transmitting a commercial or something that the traveler does not recognize when the favorite network provider is selected, the traveler may not realize that the favorite network provider is selected and continue searching from one channel to the next. The traveler may feel that a significant amount of time is wasted changing from one channel to the next channel before eventually locating the favorite network provider. The traveler may also have a similar experience when attempting to tune the radio in a rental car to a favorite national radio station.

SUMMARY

In some embodiments, a system is provided for intelligent handset remote control. The system includes a processor on a handset and a remote control component. When executed by the processor, the remote control component stores a list of media network providers, determines a location associated with the handset, retrieves an index associated with a media presentation device based on the location, and maps each of the media network providers in the list with at most one entry in the index. The remote control component also presents the list of media network providers to a user interface for the handset as a list of selectable inputs, receives a selection of one of the list of selectable inputs via the user interface, and transmits a command to the media presentation device to present media based on an entry in the index that corresponds to the selection.

In some embodiments, a method is provided for intelligent handset remote control. A list of media network providers is stored on a handset. A location associated with the handset is determined. A first index associated with a media presentation device is retrieved based on the location. A second index associated with the media presentation device is retrieved based on the location. The first index or the second index is identified as the applicable index for the media presentation device. Each of the media network providers in the list is mapped with at most one entry in the applicable index. The list of media network providers is presented to a user interface for the handset as a list of selectable inputs. A selection of one of the list of selectable inputs is received via the user interface. A command is transmitted to the media presentation device to present media based on an entry in the applicable index that corresponds to the selection.

In some embodiments, a system is provided for intelligent handset remote control. The system includes a processor on a handset and a remote control component. When executed by the processor, the remote control component stores a list of media network providers, retrieves an index from a media presentation device, and maps each of the media network providers in the list with at most one entry in the index. The remote control component also presents the list of media network providers to a user interface for the handset as a list of selectable inputs, receives a selection of one of the list of selectable inputs via the user interface, and transmits a command to the media presentation device to present media based on an entry in the index that corresponds to the selection.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 shows a block diagram of an illustrative handset.

FIG. 5 shows a block diagram of an illustrative software configuration for a handset.

DETAILED DESCRIPTION

Figure 1:
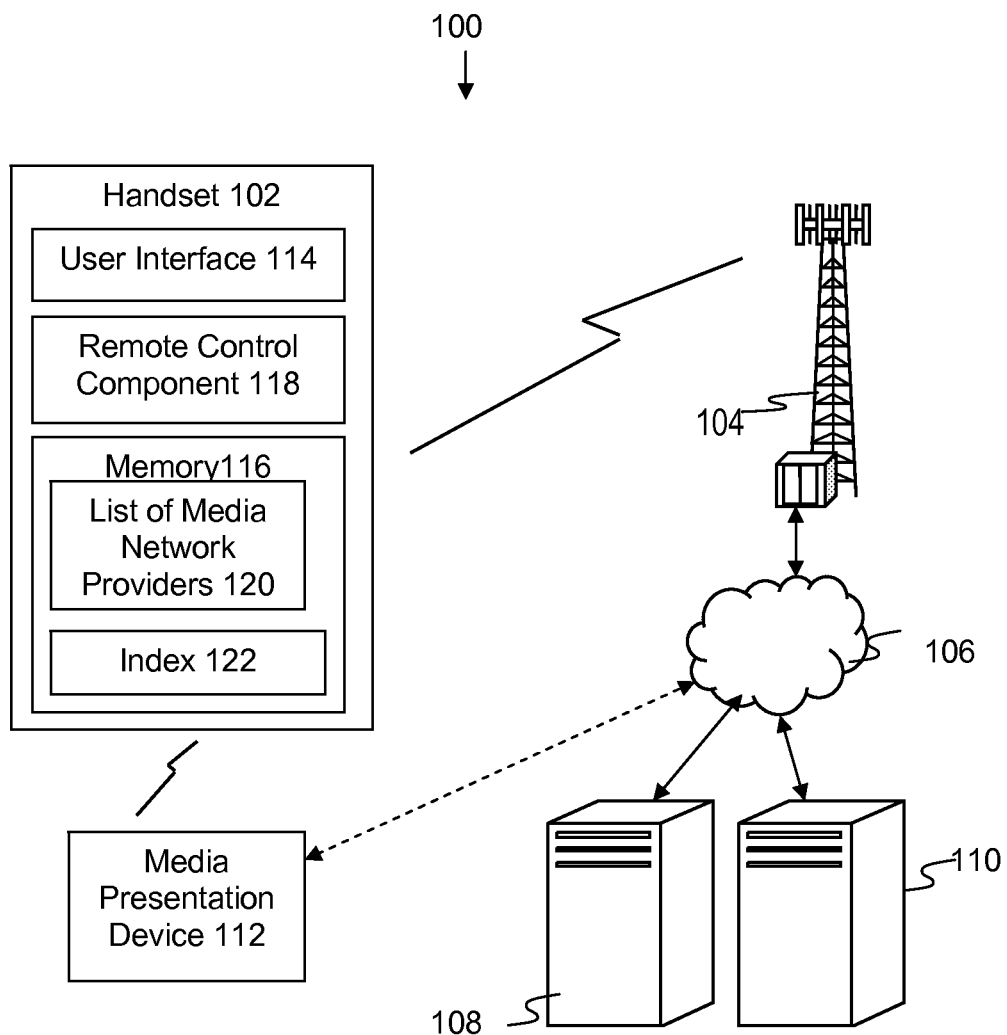
FIG. 1 shows a block diagram of a system for intelligent handset remote control according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In some embodiments, a system is provided for intelligent handset remote control. A remote control component on a handset stores a list of media network providers, determines a location associated with the handset, retrieves an index associated with a media presentation device based on the location, and maps each of the media network providers in the list with at most one entry in the index. The index cross references media network providers with media selection identifiers for a media package provider associated with a media presentation device. For example, a mobile phone stores a list that includes a user's favorite national news network and the user's favorite national sports network before the user goes on vacation. The mobile phone uses a global positioning system (GPS) sensor before entering a hotel to determine that the mobile phone is located in a specific hotel in a particular city. The mobile phone retrieves an index that cross references television network providers with corresponding television channel numbers for the cable television provider that provides television service for the televisions in the hotel. The mobile phone maps each of the user's favorite national television network providers to a station identifier in the index for each of the user's favorite national television network providers that are provided by the cable television provider.

The remote control component also presents the list of media network providers to a user interface for the handset as a list of selectable inputs, receives a selection of one of the list of selectable inputs via the user interface, and transmits a command to the media presentation device to present media based on an entry in the index that corresponds to the selection. For example, the mobile phone presents the list of the user's favorite national television network providers as a list of selectable inputs, and receives a selection of the user's favorite national news network provider. Based on the station identifier in the index of television channel numbers that the handset has mapped to the entry in the list of favorite national television network providers that corresponds to the user's selection, the mobile phone transmits a command to the hotel television to change the channel to the television channel number associated with the user's selection by the handset.

If the handset retrieves multiple indexes that are associated with a location, the handset may identify which index is the applicable index for the media presentation device. For example, if the hotel is located in an area serviced by two cable television providers, the mobile phone retrieves the cable television providers' indexes, and transmits a command to the television to change to a channel number that the two indexes use for two different television network providers. Based on the channel displayed by the television, the mobile phone determines which cable television provider provides service at the location, thereby determining which index to use for mapping to the list of favorite national television network providers. Alternatively, the handset may retrieve the index from the media presentation device without the need to determine the handset's location. For example, the mobile phone retrieves the index from the hotel television if this capability exists for the hotel television. Therefore, a traveler may not have to spend any time changing channels or searching through a long list of every available channel to be able to watch their favorite national television network providers after a long day of travel or work away from home.

FIG. 1 shows a block diagram of a system 100 for intelligent handset remote control according to some embodiments of the present disclosure. The system 100 includes a handset 102, a base transceiver station (BTS) 104, a network 106, a content server 108, a media network provider server 110, and a media presentation device 112. The handset 102 may communicate with the servers 108-110 via the base transceiver station 104 and the network 106. The handset 102, which may be referred to as the mobile phone 102, may also communicate with the media presentation device 112, which may be referred to as the television 112, the set top box 112, or the radio 112. Communicating with the media presentation device 112 may include communicating via the television 112, the set top box 112, the radio 112, and/or the media network provider server 110. The handset 102 may communicate directly with the media presentation device 112 via wireless communication, such as code division multiple access (CDMA) communication, wideband code division multiple access (WCDMA) communication, global system for mobile communication (GSM) communication, long term evolution (LTE) communication, worldwide interoperability for microwave access (WiMAX) communication, Bluetooth communication, wireless fidelity (WiFi) communication, near field communication (NFC), and infrared communication. The handset 102 may also communicate with the media presentation device 112 indirectly, for example by transmitting a command to the base transceiver station 104, via the base transceiver station 104 to the network 106, and via the network 106 to the media presentation device 112.

The handset 102 includes a user interface 114, a memory 116, and a remote control component 118. The memory 116 may include a list of media network providers 120 and an index 122. The list of media network providers 120 may include a television network, a television station, a radio network, and/or a radio station. The index 122 may include identifiers for television network providers, such as channel numbers, and/or radio transmission frequencies or radio station numbers. The user interface 114 may present the list of media network providers 120 to the user for selection.

FIG. 1 depicts the components 102-122 for the purpose of an example, as the system 100 may include any number and type of the components 102-122. Some details and/or components of the system 100 are not shown or described so as to not crowd FIG. 1 with details.

The remote control component 118 stores a list of media network providers 120. For example, the mobile phone 102 stores the list 120 that includes a user's favorite national news network provider and the user's favorite national sports network provider. The entries in the list 120 may be provided by the handset 102 when the handset 102 is purchased and/or entered by the user after the handset 102 is purchased. The user interface 114 may present controls for selecting media content, for example for selecting the media presentation device 112 to the local channel and/or cable channel associated with the user's favorite national sports network provider.

The remote control component 118 may determine the location associated with the handset 102 by executing a location fix technology that includes an advanced forward link trilateration technology, a cell tower identification technology, a global positioning system technology, and/or a hybrid location fix technology. For example, the mobile phone 102 uses a global positioning system (GPS) sensor before entering a hotel to determine that the mobile phone 102 is located at a specific hotel in Chicago. The location associated with the handset 102 may be based on an entry of a schedule that indicates when the handset 102 is scheduled to be at the location. For example, the remote control component 118 determines that the mobile phone 102 reserves a hotel room in Chicago on the last Friday of a month, and determines the location for the mobile phone 102 on that Friday based on the location of the Chicago hotel. Upon registration at the Chicago hotel, the hotel may also provide an index 122 to the mobile phone 102 for some or all of the other hotels in the same chain of hotels, for example in a text message to the mobile phone 102.

The remote control component 118 may retrieve the index 122 associated with the media presentation device 112 from the content server 108 based on a media package provider associated with the location. For example, the mobile phone 102 retrieves the index 122 that cross references television network providers with television channel numbers for the cable television provider that provides television service for the television 112 in the Chicago hotel. The remote control component 118 may retrieve the index 122 from the content server 108 via over-the-air communication, which may be based on an integrated digital enhanced network (IDEN) communication technology, a code division multiple access (CDMA) technology, a wideband code division multiple access (WCDMA), a global system for mobile communication (GSM) technology, an universal mobile telecommunications system (UMTS) technology, a long-term evolution (LTE) technology, a worldwide interoperability for microwave access (WiMAX) technology, or another air interface protocol technology. The remote control component 118 may also retrieve the index 122 from the content server 108 via a universal serial bus (USB) port. The remote control component 118 may retrieve the index 122 only for the entries in the list of media network providers 120. For example, if the list 120 includes only three of the user's favorite national television network providers, the mobile phone 102 may retrieve information in the index 122 for only the entries that match the list 120. If the index 122 lacks an entry for one of the entries in the list 120, the handset 102 may indicate this lack of a corresponding entry when the handset 102 displays the list 120 via the user interface 114.

If the handset 102 retrieves multiple indexes 122 that are associated with a location, the handset 102 may identify which index 122 is applicable for the media presentation device 112. For example, if the Chicago hotel is located in an area serviced by two cable television providers, the mobile phone 102 retrieves the cable television providers' indexes 122. To identify which index 122 is applicable for the media presentation device 112, the handset 102 transmits a command to the media presentation device 112 to present media based on an entry that differs between the indexes 122. For example, the mobile phone 102 transmits a command to the television 112 to change to a channel number that the two indexes 122 use for two different television network providers. In this example, both cable television providers may assign channel number 5 to the user's favorite national television news network provider, but the first cable television provider may assign channel number 9 to the user's favorite national sports network provider while the second cable television provider may assign channel number 19 to the user's favorite national sports network provider. To determine which of the cable television providers provides service to the Chicago hotel, the mobile phone 102 transmits a command to the television 112 to change to either channel number 9 or 19.

The remote control component 118 may identify the applicable index 122 based on meta-data received from the media presentation device 112 or identify the applicable index 122 based on input received from the user interface 114. For example, the mobile phone 102 identifies the meta-data received from the television 112 transmitting channel number 9 as indicating that the television 112 is transmitting the user's favorite national sports network provider. The remote control component 118 infers from the meta-data that the first cable television provider provides service to the Chicago hotel, such that the mobile phone 102 determines to use the index 122 for the first cable television provider for mapping to the list 120 of the favorite national television network providers. In another example, the mobile phone 102 prompts the user via the user interface 114 to identify whether the television 112 that is transmitting channel number 19 is transmitting the user's favorite national sports network provider. If the user indicates that the currently transmitted channel 19 is not the user's favorite national sports network provider, the mobile phone 102 determines that the second cable television provider does not provide service to the Chicago hotel, such that the mobile phone 102 determines to use the index 122 for the first cable television provider for mapping to the list 120 of the favorite national television network providers.

Alternatively, the handset 102 may retrieve the index 122 from the media presentation device 112 without the need to determine the location of the handset 102. For example, the mobile phone 102 retrieves the index 122 from the Chicago hotel television 112 if this capability exists for the Chicago hotel television 112. The mobile phone 102 may attempt to communicate with the television 112 using a variety of television communication bands until the mobile phone 102 identifies a television communication band that is effective for communication. The mobile phone 102 may prompt the user to identify the brand and/or model of television 112 via the user interface 114 to expedite the identification of the television communication band. In another example, the mobile phone 102 may receive the index 122 in the lobby of the Chicago hotel or in the traveler's room via a broadcast from an access point or other device in communication with a computer in the Chicago hotel, for example via a Bluetooth communication link, via a WiFi communication link, near a near field communication link, through an infrared communication link, or via some other communication link.

The remote control component 118 maps each of the media network providers in the list 120 with at most one entry in the index 122. For example, the mobile phone 102 maps the user's favorite national television news network provider to channel number 5 and the user's favorite national sports network provider to channel number 9.

The remote control component 118 presents the list of media network providers 120 to the user interface 114 as a list of selectable inputs. For example, the mobile phone 102 presents the list 120 that includes the user's favorite national television news network provider and the user's favorite national sports network provider as a list of selectable inputs on the user interface 114. In contrast to the user scrolling through a guide that is ordered based on numbers, such as using a directional key to go down a list of channels that correspond to channels 2, 3, 4, 5, 6, etc., the list 120 of selectable inputs may be arranged based on the user's preference and the list 120 does not include any reference to numbers. For example, the list 120 of media network providers may be presented in alphabetical order to assist the user in locating a desired media network provider, such as list order of a national education network provider (NEC), a national news network provider (NNC), and a national sports network provider (NSC), even though the channel numbers that correspond to these network providers are 95, 5, and 9. In another example, the list 120 of media network providers may be presented in a user preference order to assist the user in locating a desired media network provider, such as a list order of NSC, NEC, and NNC, even though the channel numbers that correspond to these network providers are 9, 95, and 5. The remote control component displays the list 120 that does not include any numbers because the user selects the media network providers based on selecting selectable inputs that list the names or acronyms of media network providers. In this embodiment, the user does not select the media network providers based on selecting a number assigned by a media package provider to a media network provider, such as channel 9 assigned by a cable television provider to a national sports network provider.

The remote control component 118 receives a selection of one of the list of selectable inputs via the user interface 114. For example, the mobile phone 102 receives a selection of the user's favorite national news network provider.

The remote control component 118 transmits a command to the media presentation device 112 to present media based on an entry in the index 122 that corresponds to the selection. For example, the mobile phone 102 transmits a command to the hotel television 112 to change the channel to channel number 9, which the remote control component 118 maps to the selection of the user's favorite national news network provider. The remote control component 118 may transmit the command to the media presentation device 112 via contactless communication. The remote control component 118 may transmit the command to the media presentation device 112 via Bluetooth radio communication, via WiFi radio communication, via industrial, scientific, and medical (ISM) band radio communication, or via other radio communication. The remote control component 118 may transmit the command to the media presentation device 112 via ultrasound signals or via optical signals such as infrared signals. The media presentation device 112 receives the command to change channel from the remote control component 118 and/or the handset 102 and adapts the television tuner, radio tuner, or other media playback device accordingly. Therefore, a traveler may not have to spend any time changing channels or searching through a long list of every available channels to be able to watch a favorite national television network provider or to listen to a favorite radio program after a long day of travel or work away from home.

The remote control component 118 may provide the identification of the applicable index 122 for the media presentation device 112 to the handset 102 based on a subsequent determination of the location associated with the handset 102 or a second handset 102 based on a subsequent determination of the location associated with the second handset 102. For example, having identified that the first cable television provider provides television service to the Chicago hotel, the remote control component 118 does not have to determine which of multiple cable television providers provides service to the Chicago hotel the next time that the handset 102 is located at the Chicago hotel. In another example, having identified that the first cable television provider provides television service to the Chicago hotel, the content server 108 provides the index 122 associated with the first cable television provider when the second handset 102 is subsequently located at the same Chicago hotel.

The remote control component 118 may retrieve a third index associated with the media presentation device 112 in response to a determination that the handset 102 is approaching a geographical limit associated with the first index and/or the second index. For example, if the mobile phone 102 is traveling to northern Chicago where yet another cable television provider provides service, the mobile phone 102 retrieves the index 122 associated with this additional cable television provider. The remote control component 118 may add the third index to the memory 116 or replace the first index and/or the second index in the memory 116. For example, the mobile phone 102 stores the additional index 122 in the memory 116. The remote control component 118 may determine whether to replace the first index and/or the second index based on a direction opposite to a direction associated with the geographical limit associated with the first index and/or the second index. For example, if the second index 122 is associated with a cable television provider that does not provide service in northern Chicago, the mobile phone 102 may substitute the third index 122 for the second index 122 in the memory 116. In this manner, the handset 102 may retrieve any index 122 before the handset 102 actually needs any additional indexes 122, thereby ensuring that the applicable index 122 is mapped to the list 120 before the handset needs the index 122.

While the description above used television programming media as an example, one skilled in the art will readily appreciate that the system 100 may also be implemented to provide similar functionality for selecting nationally syndicated radio media programming and/or satellite radio programming without having to be familiar with local channel numbers to select the preferred media. The functionality of system 100 may be useful in a variety of different use cases and/or use scenarios, including tuning a radio in an automobile, for example when driving to a personal automobile to a distant city or for example when driving a rented automobile when visiting a distant city.

Figure 2:
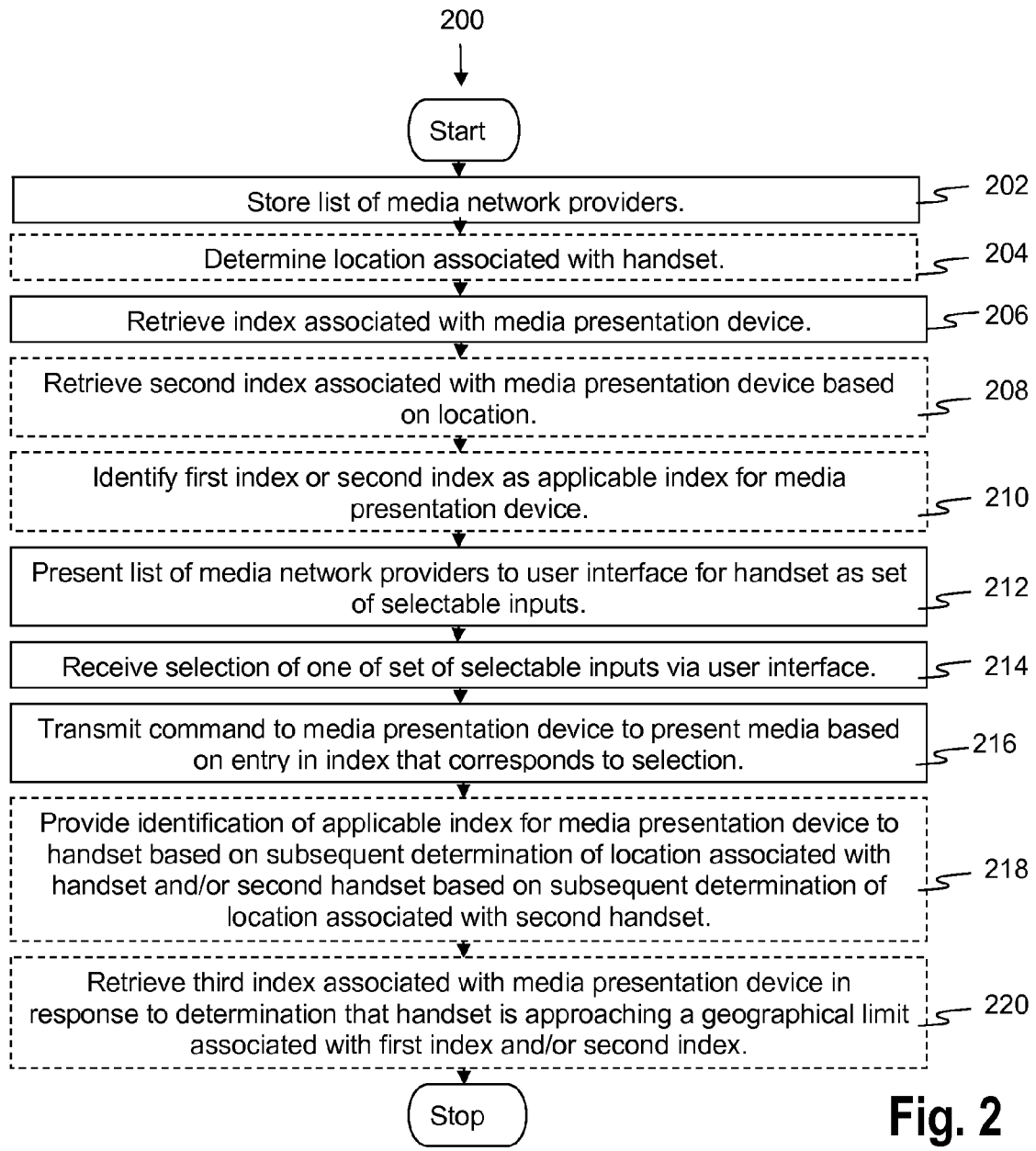
FIG. 2 shows a flowchart of a method for intelligent handset remote control according to some embodiments of the present disclosure.

FIG. 2 shows a flowchart of a method 200 for intelligent handset remote control according to some embodiments of the present disclosure. The system 100 can execute the method 200 to transmit a command to the media presentation device 112 to present media based on a user selection made via the handset 102.

In box 202, a list of media network providers is stored. For example, the remote control component 118 stores the list of media network providers 120 input by a user in a dialog box provided by the user interface 114, such that the list 120 includes the user's favorite national news, sports, and education network providers.

In box 204, a location associated with a handset is optionally determined. For example, the remote control component 118 determines that the handset 102 is located in a specific Chicago hotel.

In box 206, an index associated with a media presentation device is retrieved. For example, the remote control component 118 retrieves the index 122 associated with the television 112 in the Chicago hotel from the server 108.

In box 208, a second index associated with a media presentation device is optionally retrieved based on a location. For example, the remote control component 118 retrieves the second index 122 associated with the television 112 based on the location in the Chicago hotel.

In box 210, a first index or a second index is optionally identified as an applicable index for a media presentation device. For example, the remote control component 118 identifies the first index 122 as applicable for the television 112 in the Chicago hotel.

In box 212, a list of media network providers is presented to a user interface for a handset as a set of selectable inputs. For example, the remote control component 118 presents the list 120 that includes the user's favorite national news, sports, and education network providers to the user interface 114 as a set of selectable inputs.

In box 214, a selection of one of a set of selectable inputs is received via a user interface. For example, the remote control component 118 receives the selection of the user's favorite national news network provider via the user interface 114.

In box 216, a command is transmitted to a media presentation device to present media based on an entry in an index that corresponds to a selection. For example, the remote control component 118 transmits a command to the television 112 to present channel 5 based on the selection of the user's favorite national news network provider.

In box 218, identification of an applicable index for a media presentation device is optionally provided to a handset based on a subsequent determination of a location associated with the handset and/or a second handset based on a subsequent determination of a location associated with the second handset. For example, the remote control component 118 provides identification of the applicable index 122 for the television 112 to the mobile phone 102 the next time that the mobile phone 102 is located in the Chicago hotel.

In box 220, a third index associated with a media presentation device is optionally retrieved in response to a determination that a handset is approaching a geographical limit associated with a first index and/or a second index. For example, the remote control component 118 retrieves the third index 122 associated with the television 112 in response to a determination that the mobile phone 102 is heading to northern Chicago.

Figure 3:
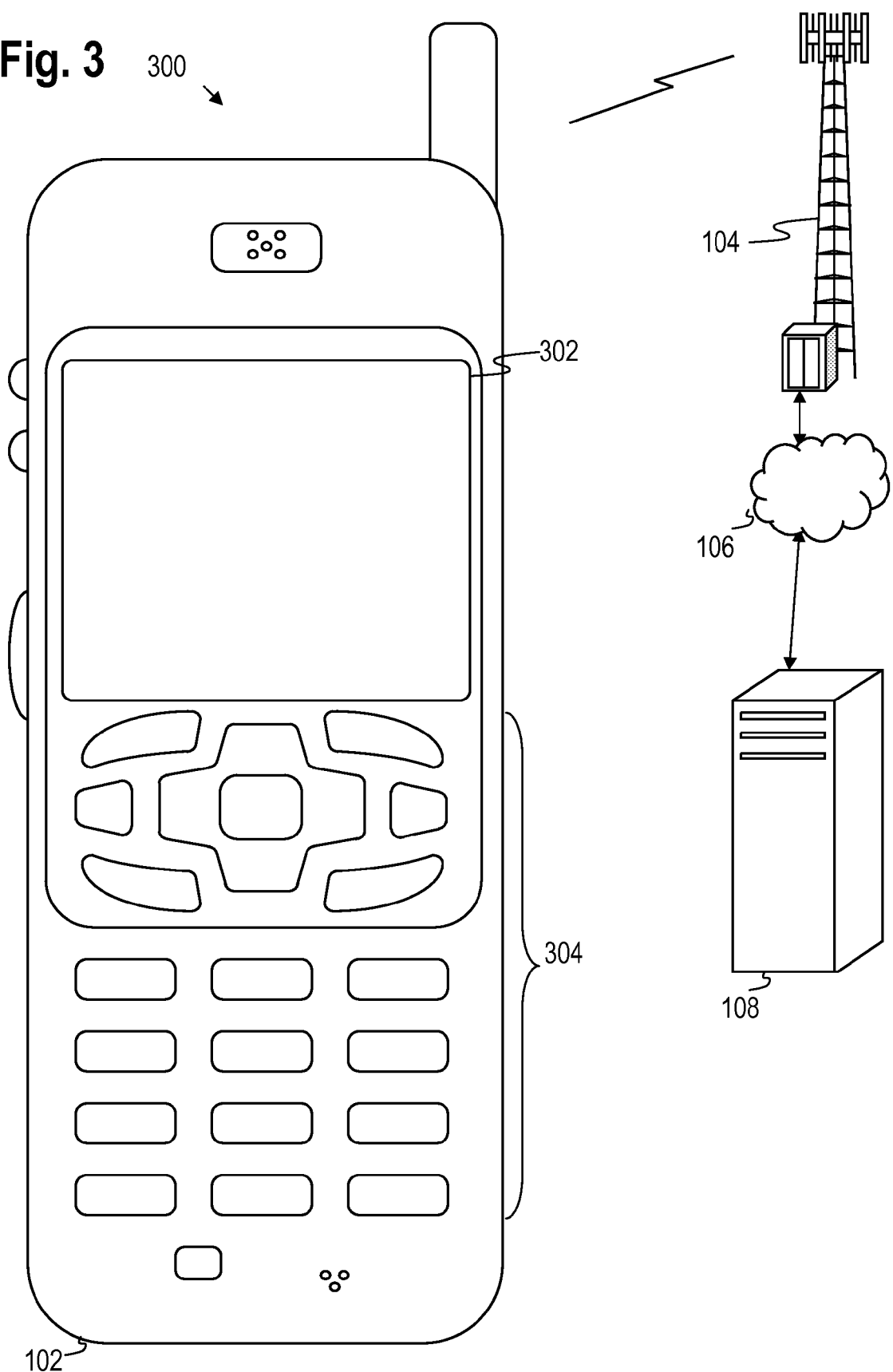
FIG. 3 shows an illustrative wireless communications system.

FIG. 3 shows a wireless communications system 300 including the handset 102. FIG. 3 depicts the handset 102, which is operable for implementing aspects of the present disclosure, but the present disclosure should not be limited to these implementations. Though illustrated as a mobile phone, the handset 102 may take various forms including a personal computer, a mobile telecommunication device, a mobile handset, a personal digital assistant (PDA), a mobile computer, a handheld gaming device, a wireless mobile device, a pager, a portable computer, a tablet computer, a laptop computer, a media player, a digital camera, a digital music player, or a digital calculator. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 302 and a touch-sensitive surface or keys 304 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 302 to show a web page. The web page may be obtained via wireless communications with the base transceiver station 104, a wireless network access node, a peer handset 102 or any other wireless communication network or system. While a single base transceiver station 104 is illustrated, it is understood that the wireless communication system may comprise additional base transceiver stations. In some instances, the handset 102 may be in communication with multiple base transceiver stations 104 at the same time. The base transceiver station 104 (or wireless network access node) is coupled to the network 106, such as the Internet. Via the wireless link and the wired network, the handset 102 has access to information on various servers, such as the server 108. The server 108 may provide content that may be shown on the display 302. Alternately, the handset 102 may access the base transceiver station 104 through a peer handset 102 acting as an intermediary, in a relay type or hop type of connection.

FIG. 4 shows a block diagram of the handset 102. While a variety of known components of handsets 102 are depicted, in an embodiment a subset of the listed components and/or additional components not listed may be included in the handset 102. The handset 102 includes a digital signal processor (DSP) 402 and a memory 404. As shown, the handset 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 102 to send and receive information from a radio access network (RAN) or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the handset 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the handset 102 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets and/or wireless base stations.

The input/output interface 418 may further connect the DSP 402 to the vibrator 426 that, when triggered, causes the handset 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 102. Another input mechanism may be the touch screen LCD 430, which may also display text and/or graphics to the user. The touch screen LCD controller 432 couples the DSP 402 to the touch screen LCD 430.

The CCD camera 434 enables the handset 102 to take digital pictures. The DSP 402 communicates with the CCD camera 434 via the camera controller 436. The GPS sensor 438 is coupled to the DSP 402 to decode global positioning system signals, thereby enabling the handset 102 to determine its position. In another embodiment, a camera operating according to a technology other than charge coupled device cameras may be employed. Various other peripherals may also be included to provide additional functions, e.g., radio and television reception.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 102. Also shown in FIG. 5 are a web browser application 508, a media player application 510, JAVA applets 512, and the remote control component 118. The web browser application 508 configures the handset 102 to operate as a web browser, allowing a user to enter information into forms and select links to retrieve and view web pages. The media player application 510 configures the handset 102 to retrieve and play audio or audiovisual media. The JAVA applets 512 configure the handset 102 to provide games, utilities, and other functionality.

Figure 6:
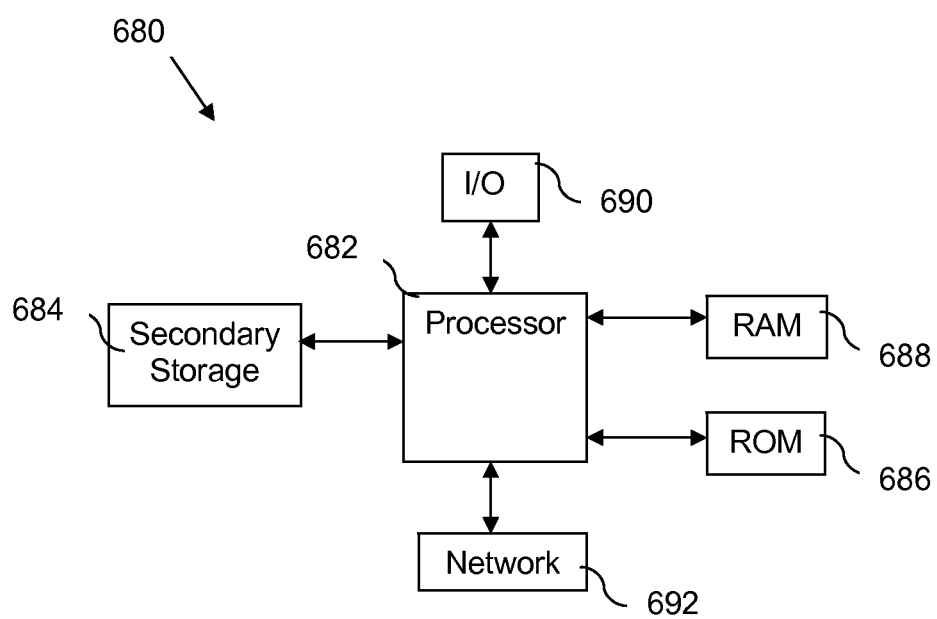
FIG. 6 illustrates an exemplary computer system suitable for implementing the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), wideband code division multiple access (WCDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for an intelligent handset remote control, comprising:
a processor on a handset; and
a remote control component that, when executed by the processor,
stores a list of media network providers,
determines a location associated with the handset by executing a location fix technology,
retrieves a plurality of indexes associated with different media package providers based on the location, wherein one of the plurality of indexes is associated with a media presentation display device,
determines which media package provider of the different media package providers provides service to the location by:
transmitting a first command to the media presentation display device to present media based on an entry that differs between the plurality of indexes, and
identifying the one of the plurality of indexes associated with the media presentation display device based on the entry that differs between the plurality of indexes and further based on meta-data received from the media presentation display device subsequent to transmitting the first command to present media based on the entry that differs between the plurality of indexes,
synchronizes each of the media network providers in the list with at most one entry in the one of the plurality of indexes,
presents the list of media network providers to a user interface for the handset as a list of selectable inputs,
receives a selection of one of the list of selectable inputs via the user interface, and
transmits a second command to the media presentation display device to present media based on an entry in the one of the plurality of indexes when the entry in the one of the plurality of indexes corresponds to the selection.

2. The system of claim 1, wherein the handset is one of a personal computer, a mobile telecommunication device, a mobile handset, a personal digital assistant, a mobile computer, a handheld gaming device, a wireless mobile device, a pager, a portable computer, a tablet computer, a laptop computer, a media player, a digital camera, a digital music player, and a digital calculator.

3. The system of claim 1, wherein the location fix technology comprises one of an advanced forward link trilateration technology, a cell tower identification technology, a global positioning system technology, and a hybrid location fix technology.

4. The system of claim 1, wherein the list of media network providers comprise at least one of a television network, a television station, a radio network, and a radio station.

5. The system of claim 1, wherein the plurality of indexes comprises identifiers for at least one of television channels and radio transmission frequencies.

6. The system of claim 1, wherein the media presentation device is one of a television, a set top box, a media server, and a radio.

7. The system of claim 1, wherein the remote control component retrieves the plurality of indexes based on the media package providers associated with the location.

8. The system of claim 1, wherein the remote control component retrieves the plurality of indexes via over-the-air communication.

9. The system of claim 8, wherein the over-the-air communication comprises one of an integrated digital enhanced network (IDEN) communication technology, a code division multiple access (CDMA) technology, a wideband code division multiple access (WCDMA) technology, a long-term evolution (LTE) technology, a global system for mobile communication (GSM) technology, a universal mobile telecommunications system (UMTS) technology, and a worldwide interoperability for microwave access (WiMAX) technology.

10. A computer implemented method for an intelligent handset remote control, comprising:
    storing a list of media network providers on a handset;
    determining a location associated with the handset;
    retrieving a plurality of indexes associated with different media package providers based on the location, wherein one of the plurality of indexes is associated with a media presentation display device;
    determining which media package provider of the different media package providers provides service to the location by:
        transmitting a first command to the media presentation display device to present media based on an entry that differs between the plurality of indexes;
        identifying the one of the plurality of indexes associated with the media presentation display device based on the entry that differs between the plurality of indexes and further based on meta-data received from the media presentation display device subsequent to transmitting the first command to present media based on the entry that differs between the plurality of indexes;
    synchronizing each of the media network providers in the list with at most one entry in the one of the plurality of indexes;
    presenting the list of media network providers to a user interface for the handset as a list of selectable inputs;
    receiving a selection of one of the list of selectable inputs via the user interface; and
    transmitting a second command to the media presentation display device to present media on the media presentation display device based on an entry in the one of the plurality of indexes that corresponds to the selection, wherein the handset and the media presentation display device are separate devices.

11. The computer implemented method of claim 10, wherein the location associated with the handset is based on an entry of a schedule when the handset is scheduled to be at the location.

12. The computer implemented method of claim 10, further comprising retrieving an other index associated with the media presentation device in response to a determination that the handset is approaching a geographical limit associated with at least one of the plurality of indexes.

13. The computer implemented method of claim 12, wherein retrieving the other index comprises one of adding the other index to a memory in the handset and replacing at least one of the plurality of indexes.

14. The computer implemented method of claim 13, wherein a determination for replacing the at least one of the plurality of indexes is based on a direction opposite to a direction associated with the geographical limit associated with the at least one of the plurality of indexes.

15. The computer implemented method of claim 10, further comprising providing an identification of the one of the plurality of indexes for the media presentation device to at least one of the handset based on a subsequent determination of the location associated with the handset and a second handset based on a subsequent determination of the location associated with the second handset.

16. The computer implemented method of claim 10, wherein identifying the one of the plurality of indexes is further based on input received from the user interface subsequent to transmitting the first command to present media based on the entry that differs between the plurality of indexes.

* * * * *